United States Patent [19]

Baymak et al.

[11] Patent Number: 4,832,404
[45] Date of Patent: May 23, 1989

[54] FLIGHT ATTENDANT SEAT AND ITS ARRANGEMENT IN AN AIRCRAFT

[75] Inventors: Faruk Baymak, Hamburg; Helmut Stueben, Gruenendeich, both of Fed. Rep. of Germany

[73] Assignee: Messerschmitt-Boelkow-Blohm GmbH, Munich, Fed. Rep. of Germany

[21] Appl. No.: 44,249

[22] PCT Filed: Aug. 29, 1986

[86] PCT No.: PCT/DE86/00344
§ 371 Date: Apr. 22, 1987
§ 102(e) Date: Apr. 22, 1987

[87] PCT Pub. No.: WO87/01355
PCT Pub. Date: Mar. 12, 1987

[30] Foreign Application Priority Data

Aug. 30, 1985 [DE] Fed. Rep. of Germany ....... 3531139

[51] Int. Cl.$^4$ .............................................. B60N 1/02
[52] U.S. Cl. ..................... 297/333; 280/808; 296/63; 297/14; 297/244; 297/484
[58] Field of Search ............... 297/14, 232, 331, 332, 297/333, 484, 244, 468; 296/63, 64, 65 R, 67, 69, 65 A; 280/801, 808

[56] References Cited

U.S. PATENT DOCUMENTS

| | | | |
|---|---|---|---|
| 2,634,802 | 4/1953 | Stumm | 297/484 X |
| 3,762,764 | 10/1973 | McJunkin | 276/63 X |
| 3,954,280 | 5/1976 | Roberts et al. | 297/467 |
| 4,460,215 | 7/1984 | Chamberlain et al. | 297/14 |
| 4,580,832 | 4/1986 | Maruyama et al. | 297/324 X |

FOREIGN PATENT DOCUMENTS

| | | |
|---|---|---|
| 1136592 | 9/1962 | Fed. Rep. of Germany . |
| 804010 | 10/1936 | France . |
| 472715 | 6/1952 | Italy ................................. 297/332 |

Primary Examiner—Peter R. Brown
Attorney, Agent, or Firm—W. G. Fasse; D. H. Kane, Jr.

[57] ABSTRACT

A seat for a flight attendant in an aircraft is constructed to be secured to a supporting inner cabin wall. The seat unit includes a seat section tiltably supported in a mounting. The backrest unit includes a backrest cushion with a head cushion. A safety belt system, cooperates with both units, which are preassembled ready for installation. Thus, the conventional frame of the seat is avoided, whereby weight, costs, and space advantages are achieved. It is especially advantageous to provide a double seating arrangement with the seats facing in opposite directions.

3 Claims, 3 Drawing Sheets

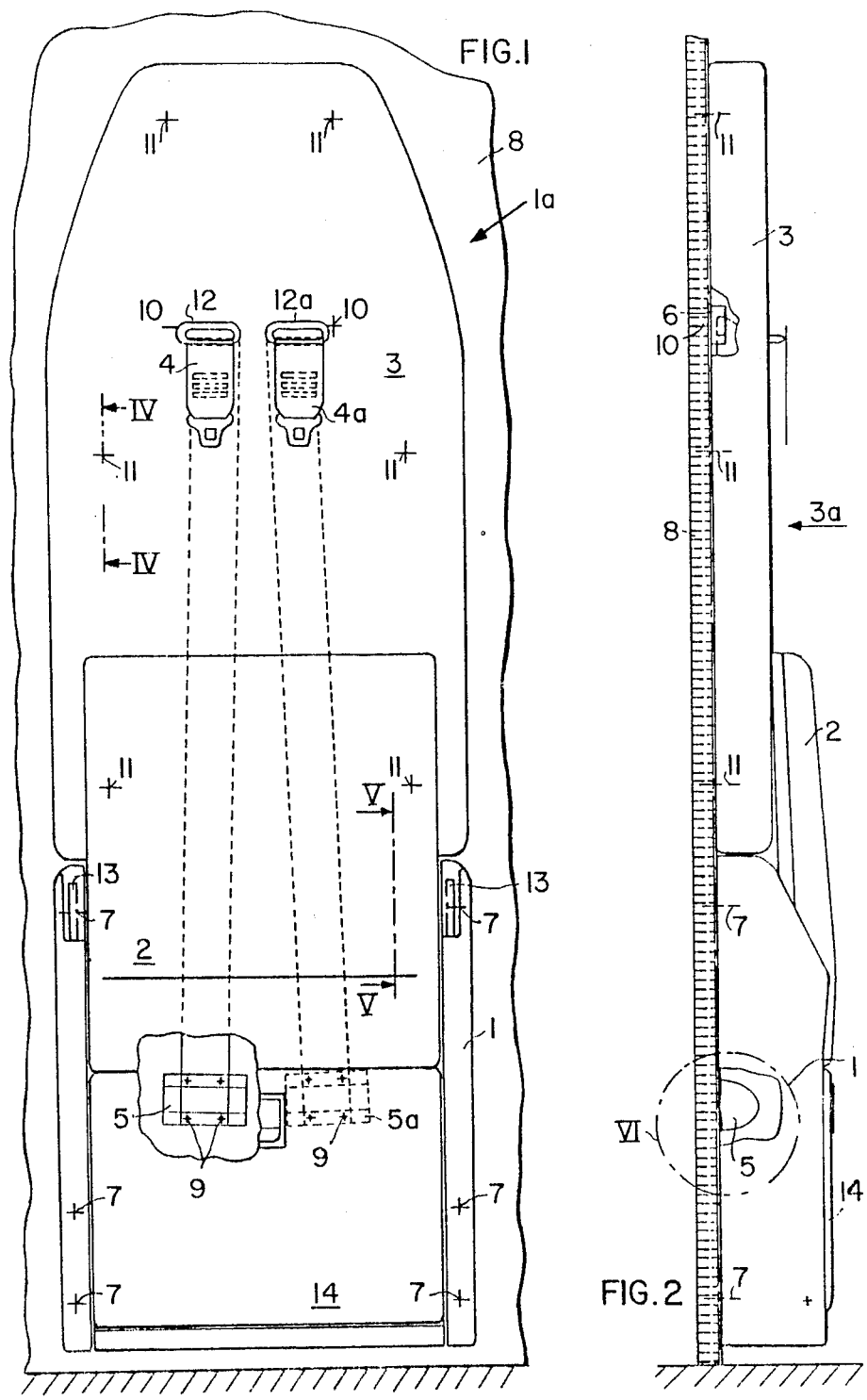

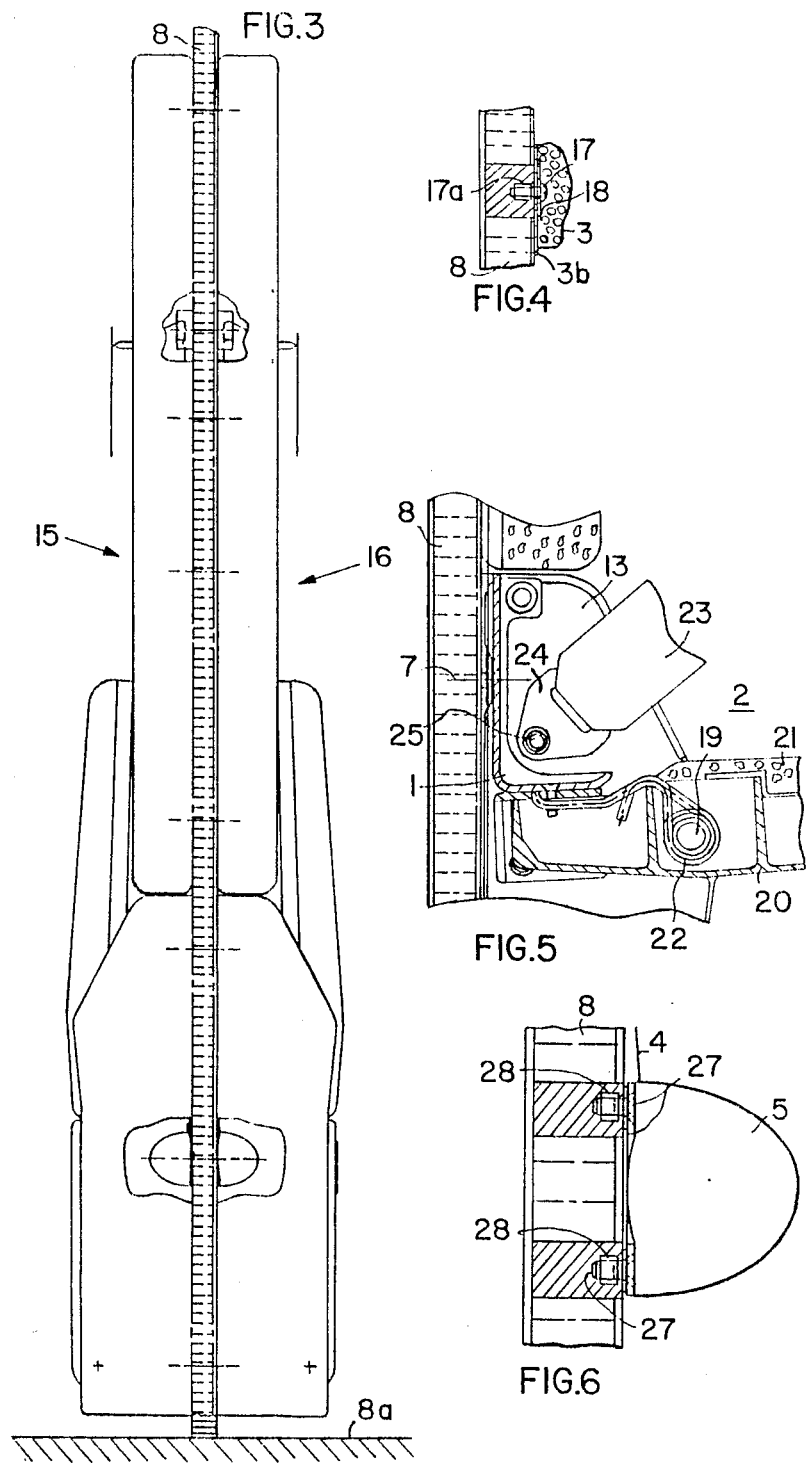

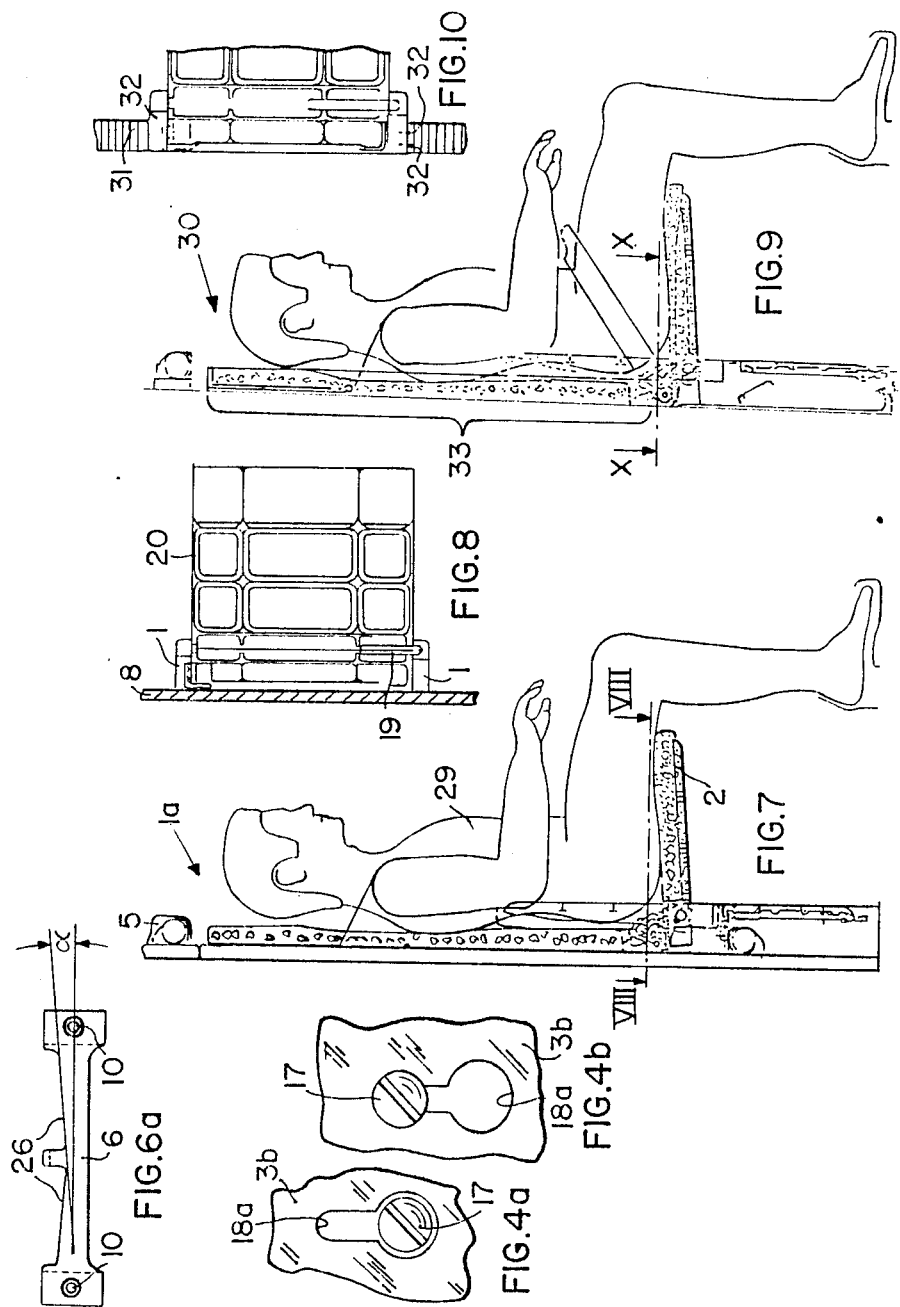

FLIGHT ATTENDANT SEAT AND ITS ARRANGEMENT IN AN AIRCRAFT

FIELD OF THE INVENTION

The invention relates to a seat and its arrangement according in an aircraft for use by a flight attendant.

DESCRIPTION OF THE PRIOR ART

A known seat of this type forms a unit ready for mounting due to a frame since all essential components of the seat such as the seat proper, the backrest, the headrest, the safety belts, are rigidly mounted to this frame. The installation of such a seat in an aircraft is accomplished by means of screwed connections, whereby securing points on the frame are connected with the floor of the cabin and with an inner cabin wall. In this conventional arrangement the seat loads occurring in the operation of the seat are introduced through the frame into the supporting inner structure of the aircraft such as the floor or the inner wall.

In this connection the following are considered to the disadvantageous, especially due to the frame, namely that the seat requires a substantial space, that it has a relatively high weight, that it provides a low seating comfort, that it is expensive to manufacture, and for example, the installation of the wall in another location causes additional work due to the connections with the floor.

German Patent Publication (DE-AS) No. 1,136,592 discloses a seat for a vehicle, crane, excavator, construction machinery, and the like which has a backrest that is directly secured to a supporting wall This known seat is tiltably arranged between pipes secured to the wall and to the floor. This type of seat solves the problem of providing for the operator two different seat elevations for a better over view. This type of seat does not provide any teaching for improving a seat for a flight attendant with regard to the space requirement, the weight, the seating comfort, and the production costs.

OBJECT OF THE INVENTION

In view of the above it is the object of the invention to develope a seat of the type mentioned in the preamble in such a way that it has distinct improvements compared to the previous solutions as far as space requirements, weight, seating comfort and production costs are concerned.

SUMMARY OF THE INVENTION

This objective has been achieved in a seat according to the invention forming a seat structure for a flight attendant in an aircraft, by the following features. A first independent completely preassembled seat unit includes a seat section, a mounting, and a support for tiltably securing said seat section in the mounting. A second independent completely preassembled backrest unit includes a backrest cushion and a stiffening. A seat belt system is provided for cooperation with the first and second preassembled units. The mounting of the preassembled seat unit includes readily accessible means for attaching the preassembled seat unit to the cabin wall. The stiffening of the backrest cushion has readily accessible keyhole type openings for attaching the preassembled backrest unit to the cabin wall in such a position relative to the preassembled seat unit that both preassembled units together form a space and weight saving seat.

The main advantage of the seat according to the invention is seen in that the above mentioned frame is avoided which primarily affects the production costs and the weight of the seat.

The present seat may be constructed as a very space saving double arrangement whereby two seats are attached to a wall to face in opposite directions.

The available space in an aircraft is used by the present seat in a space saving manner.

BRIEF DESCRIPTION OF THE DRAWINGS

The invention is illustrated in the drawing and is described in more detail in the description of the examples, wherein, FIG. 1 is a view of a seat;
FIG. 2 is a side view of the seat according to FIG. 1;
FIG. 3 is a double arrangement of the seat according to FIG. 2;
FIG. 4 is a partial section along line IV—IV in FIG. 1;
FIGS. 4a and 4b show details of the backrest unit
FIG. 5 is a partial section according to line V—V in FIG. 1;
FIG. 6 shows the detail VI according to FIG. 2;
FIG. 6a illustrates the deflection mounting 6;
FIG. 7 shows a seat for one person;
FIG. 8 shows the section VIII—VIII according to FIG. 7;
FIG. 9 shows a recessed seat; and
FIG. 10 shows a section along section line X—X in FIG. 9.

DETAILED DESCRIPTION OF PREFERRED EXAMPLE EMBODIMENTS AND OF THE BEST MODE OF THE INVENTION

FIGS. 1 and 2 show a seat 1a, essentially comprising a seat section 2 tiltably supported in a mounting device 1, a back cushion 3 with an integrated head section and a safety belt system. The safety belt system comprises substantially two shoulders belts 4 and 4a, two automatic take-up rollers 5 and 5a, a deflection mounting bracket 6 as well as a pelvis belt 23 shown in FIG. 5. The mounting device 1 constitutes with the seat section 2 an integral structural completely preassembled seat unit 1a which is connected at the locations 7 by means of screw connections to a wall 8. The automatic take-up rollers 5 and 5a, as well as the mounting 6 are screwed to the wall 8 at points 9 and 10. The structural component or completely preassembled backrest unit 3a which comprises the backrest cushion 3 made of a suitable material also includes a thin walled stiffening 3b located on the surface of the backrest cushion 3 facing the wall 8. The stiffening 3b is shown in FIG. 4b. The stiffening 3b is provided with securing means 18a for whereby the structural unit 3a is secured to the wall 8 at the locations 11. By providing a respective shape for the stiffening it is assured that the belts 4 and 4a are freely movable behind the structural unit 3a. The ends of the belts 4 and 4a are led through openings 12 and 12a in the cushion 3. Suitable belt stoppers make sure that the belts 4 and 4a are rolled up only to the illustrated position. The ends of the not shown pelvis belt are held by a respective hardware member 13. The portion of the mounting device 1 located below the seat section is constructed as a container for emergency equipment and it is closed by a flap 14. In this seat all loads occurring during operation of the seat are introduced through the mounting or through the shoulder belts 4 and 4a directly into the wall 8, except for the compression forces of the cushion. The wall 8 itself is so dimensioned that it takes up the forces resulting from relevant load conditions. It has been found that the extra effort required by this dimensioning is very small.

FIG. 3 shows a floor 8a and a wall 8 to which two seats 15 and 16, as described above, are secured. These seats are secured to both sides of the wall 8 by using the same connecting points for both seats 15 and 16. The thus constructed double arrangement with oppositely facing seats is in any event cost and weight effective while providing in certain installation instances decisive space advantages.

FIG. 4 illustrates schematically a partial section IV—IV according to FIG. 1 with the wall 8, the backrest cushion 3 and the stiffening 3b. The cushion 3 and the stiffening 3b form a completely preassembled backrest unit 3a A screw 17 is screwed, in a self-locking manner, into a threaded insert 17a rigidly held in the wall. The stiffening 3b has keyhole type openings 18a at all securing points so that the cushion 3 is mountable by simply putting the screws 17 through the openings 18a and lowering the entire backrest unit as shown in FIGS. 4a and 4b. An elastic washer 18 assures respectively a sufficient clamping action.

FIG. 5 shows the section V—V according to FIG. 1, with the wall 8 and the seating section 2 which is tiltable about a bearing stud 19 and shown in the seating position. The seating section 2 comprises primarily a support plate 20 and a cushion 21. In the unloaded state the seating section 2 is tilted into the rest position according to FIGS. 1 and 3 due to a spring 22. The end of the pelvis belt 23 is provided with a hardware member 24 which is secured to a member 26 of the mounting 1 by means of a screw 25. The Figure further shows the connecting points 7 at which the mounting device 1 is connected to the wall 8 by screws. These connecting points 7, as clearly seen in FIGS. 1 and 2, are freely accessible even though the seat unit 1a with its seat section 2, with its support plate 20, and with its mounting 1 is completely preassembled.

FIG. 6 shows the detail VI according to FIG. 2. The automatic take-up roller 5 is secured by means of screws 27 which are screwed into threaded inserts 28 in the wall. The belt 4 is led with a small spacing relative to the wall 8, to a deflecting mounting 6 not shown here. During the mounting of this seat, first the elements of the belt system are installed which are provided in the form of an installation set.

FIG. 6a shows a view of the deflecting mounting bracket 6 with both mounting points 10. The mounting has a deflecting edge 26 for each belt, both of which form a flat V-shape due to the angle α. Thus, a slanting position of the deflecting edges 26 is achieved so that the belts 4, 4a contact a person in a surface contact manner without any chafing with their edges.

FIG. 7 shows a seat 1a substantially corresponding to FIG. 1 with a person 29 sitting on the folded-out seat section 2. The section of FIG. 8 illustrates the carrier plate 20 with a bearing stud 19 without the seat cushion. The wall 8 has a constant thickness. The mounting device 1 and the wall 8 are constructed as described above. FIG. 7 shows a modification, whereby the automatic take-up rollers 5, 5a are arranged above the head cushion on the wall 8.

FIG. 9 shows an arrangement of the seat 30 which is recessed in a wall 31. The sectional view of FIG. 10 shows that the respective mounting, in this instance, comprises lateral connection points 32 for securing to the wall 31. The structural unit comprising essentially the backrest cushion 3 is indicated at 33 and is connected, corresponding to the mounting device 1, to the wall 31. Further, the structural unit 33 comprises stiffening means, not shown, for introducing the forces into the wall 31.

In the case where two seats face in opposite directions, it may be necessary that the seat are laterally displaced relative to each other, whereby different connecting points become necessary for each seat.

The above described seats provide a higher seating comfort because the thickness of the cushion can be increased due to the omission of the customary frame.

The invention is not limited to the illustrated examples, rather, the invention covers all modifications within the frame of the claims.

We claim:

1. A seat structure for a flight attendant in an aircraft for attachment to an inner supporting cabin wall, comprising a safety belt system, an independent completely preassembled seat unit including a seat section, a mounting device, and support means tiltably securing said seat section in said mounting device, an independent completely preassembled backrest unit including a backrest cushion, a head section integrated in said backrest cushion and a stiffening means, said safety belt system cooperating with said preassembled units, said mounting device comprising readily accessible means for attaching said preassembled seat unit to said cabin wall, said stiffening means comprising readily accessible keyhole type openings for attaching said preassembled backrest unit to said cabin wall in such a position relative to said preassembled seat unit that both preassembled units together form a space and weight saving seat, and wherein said safety belt system comprises shoulder safety straps and deflecting means secured to said cabin wall, said shoulder straps passing through said deflecting means, said deflecting means having guide edges forming a flat V-shape for guiding said shoulder safety straps.

2. The seat structure of claim 1, wherein said safety belt system further comprises take-up rollers secured to said cabin wall for said shoulder straps of said safety belt system.

3. The seat structure of claim 2, wherein said safety straps, said take-up rollers, and said deflecting means of said safety belt system are premounted to said cabin wall.

* * * * *